Patented Oct. 12, 1937

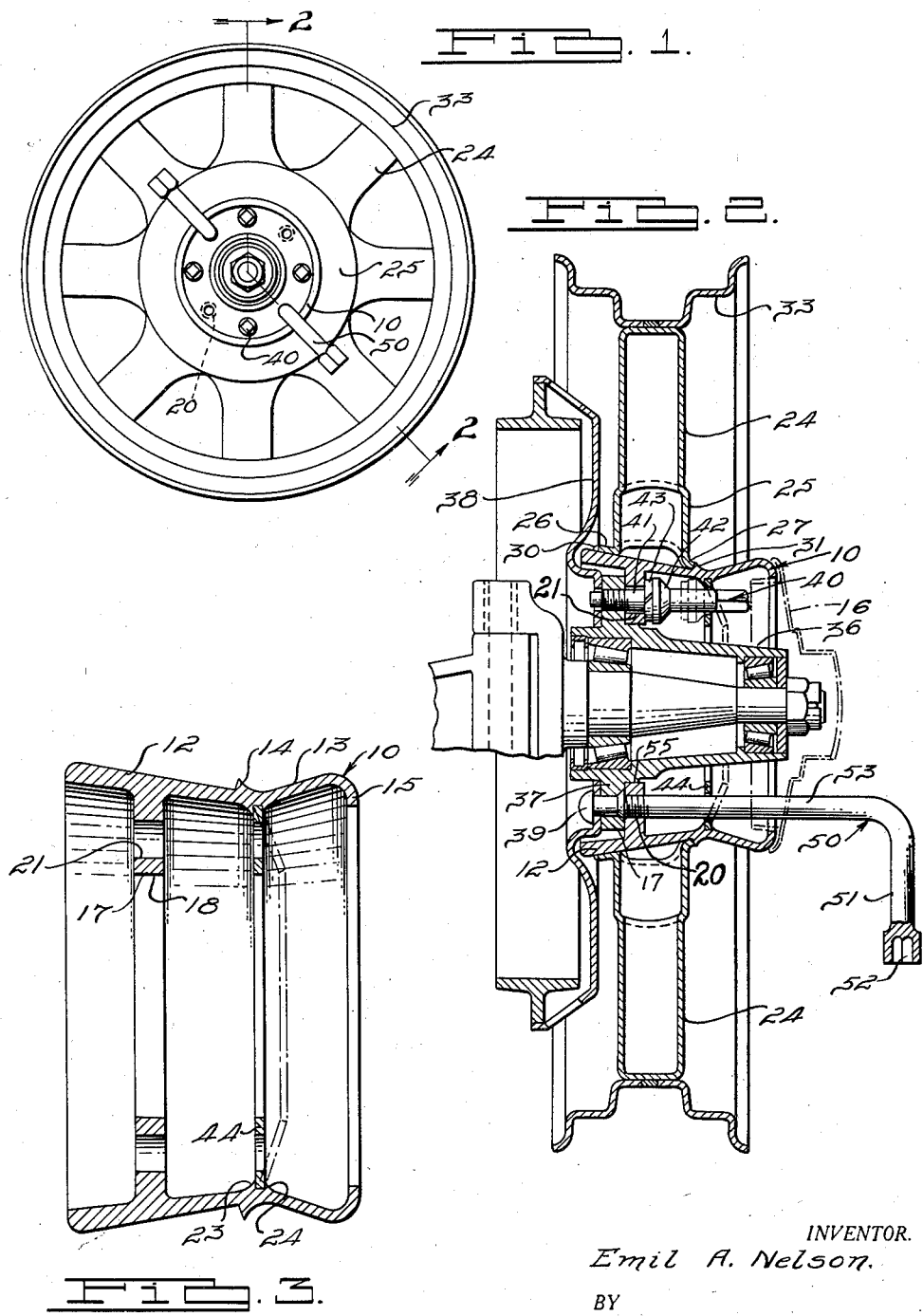

2,095,342

UNITED STATES PATENT OFFICE 2,095,342

WHEEL

Emil A. Nelson, St. Clair Shores, Mich.

Original application January 5, 1932, Serial No. 584,825. Divided and this application July 31, 1933, Serial No. 682,897

4 Claims. (Cl. 301—9)

The invention relates to wheels and constitutes a division of my application for Patent Serial No. 584,825 filed January 5, 1932, now Patent No. 1,958,974.

One object of the invention is to provide a demountable hub shell which is so constructed that it may be combined readily with different forms of rim supporting means, such as wire, wooden and metal spokes, discs and the like, and consequently, selectively employed in conjunction with various types of rim supporting means. In so far as known, hub shells for wheels having different types of rim supporting means such as outlined, are individually designed to cooperate with the particular rim supporting means employed and a single design of hub shell which may be used with practically any type of rim supporting means without altering its design or construction, has not been advanced in the art. The advantage of having a single design of hub shell which may be used with practically any type of rim supporting means should be quite manifest, because it enables wheel manufacturers to standardize on a single design of shell and in this manner reduce manufacturing expenses, while at the same time it enables standardizing of hub and brake drum constructions for accommodating any type of wheel construction.

Another object of the invention is to provide a demountable wheel including a hub shell in which the means for fastening the shell to a hub, are always maintained assembled with the shell. This prevents loss of the fastening means when the wheel is removed from the hub as ordinarily such fastening means become entirely separated from the wheel.

Another object of the invention is to provide demountable wheel having means for facilitating its manual manipulation in removing and mounting the wheel.

Another object of the invention is to provide a method of manufacturing a hub shell with hub securing means therefor, in which said securing means finally are so arranged in conjunction with the shell, that they normally will remain assembled therewith when the wheel is removed from the hub.

For a better understanding of the invention reference may be had to the drawing, wherein:

Fig. 1 is a side elevational view of a wheel constructed according to one form of the invention.

Fig. 2 is a cross-sectional view taken on a larger scale substantially along line 2—2 of Fig. 1.

Fig. 3 is a diametrical cross section of the hub shell as seen separately of the wheel, and as used with wire spokes.

Referring to Figs. 2 and 3, a hub shell preferably is formed from sheet, strip or hot rolled steel sections, and then rolled into annular form and welded at its ends. The shell has outer tapering surfaces 12 and 13 diverging outwardly from a point intermediate the ends of the shell, and an annular rib or shoulder 14 located substantially at the junction of the surface portions. The outer extremity of the surface portion 13 terminates in an inwardly directed, short flange 15, such flange being adapted primarily for connecting a hub cap to the shell as shown in broken lines at 16 in Fig. 3. Intermediate the ends of the surface portion 12, the shell is provided with an annular flange 17 on its inner surface, and the inner periphery of this flange defines an opening 18 for receiving a wheel hub. Initially the flange may be provided with bolt receiving openings arranged in circumferentially spaced relation, or such bolt receiving openings may be formed in the flange after the shell is formed into annular shape. While any number of openings in the flange 17 may be provided for accommodating bolts, Fig. 1 illustrates the flange as having 8 openings. Preferably four of such openings, indicated at 20, are spaced 90° circumferentially, and are threaded for receiving threaded ends of wheel manipulating tools which will be described presently. The other openings indicated at 21 preferably are not threaded and may be used for securing the flange 17 to the hub.

Adjacent the annular shoulder 14, the shell is provided on its inner surface with a substantial, annularly extending shoulder 23, and a smaller, annular shoulder 24 spaced therefrom and towards the flange 15, thereby providing an annular groove between such shoulders. The purpose of this groove presently will be set forth.

The shell then may be assembled with rim supporting means and according to Fig. 2 such rim supporting means is in the form of integrally associated, hollow metal spokes 24 formed from sheet metal. The method of forming such spokes into a circumferentially arranged and integral series forms particularly the subject matter of another application for patent of mine, Serial No. 584,826, filed January 5, 1932. The construction of this rim supporting means may be briefly described as follows, referring to Figs. 1 and 2. The metal spokes indicated at 24 are arranged in circumferentially spaced relation and in radial planes, and are connected at their inner ends by means of an integral, circumferentially extending hollow wall 25. This wall as shown by Fig. 2 has oppositely disposed leg portions 26 and 27, both leg portions initially being of such diameter that they and the spoke assembly may be slipped over the surface portion 13 of the hub shell and the annular shoulder 14 thereon. The leg 26 may be tapered to engage the tapered surface 12 of the shell adjacent that end of such surface of larger diameter, while the leg 27 is adapted to engage such surface adjacent the shoulder 14. After the spoke assembly is so associated with the shell the leg 27, or the spoke assembly as a whole is so shrunk that the legs abut the surface 12, the leg 27 substantially adjacent the side wall of shoulder 14.

After the parts are so associated, the legs 26 and 27 may be welded to the shell as indicated at 30 and 31. It is apparent that the shoulder 14 will serve as means for properly aligning the spoke assembly in the plane of rotation of the wheel and moreover serve as a positive abutment at the base of the tapered surface 12 for preventing, in addition to the weld, any axial movement of the spoke assembly toward the surface portion 13.

A rim 33, shown as of the drop center type may then be mounted on the outer ends of the spokes by shrinking it on or by merely slipping it over the ends of the spokes and then welding it to the spokes. When the rim is shrunk on the spokes, it is evident that the spoke assembly will be subjected to a still further shrinking tendency, thus still further insuring proper mounting of the spoke assembly on the hub shell.

Preferably the wheel described is adapted to be mounted on a hub 36 shown by Fig. 2, which has an annular, radially disposed flange 37 provided with circumferentially spaced openings coinciding with the openings in the flange 17 of the hub shell. A brake drum disc 38 carrying a drum at its outer periphery is connected to the inner side of the hub flange 37, preferably by means of rivets 39, such rivets having flat heads at their outer ends substantially flush with the outer surface of the flange to permit proper abutment of the hub shell flange 17 thereagainst. Preferably four rivets are used and such rivets project through openings in the flange spaced ninety degrees apart. When the hub shell is associated with the hub, the rivets 39 coincide with the openings 20 in the hub shell flange 17 and it will be recalled that such openings are threaded to permit securing manipulating tools to the shell flange for removing and mounting the wheel. The other openings in the hub flange are threaded and are adapted to receive bolts 40 which project through the openings 21 in the shell flange 17 and through openings in the brake disc member 38. In view of the fact that the bolts 40 normally are associated with the hub shell in such manner that they remain assembled therewith when the shell is removed from the hub, it is desired to particularly describe the manner in which the bolts are assembled with the shell and maintained in such relation.

Referring to Fig. 2, it will be noted that each of the bolts has a threaded end adapted to engage a threaded opening in the hub flange, and an unthreaded portion 41 adapted to project through one of the unthreaded openings 21 in the flange 17 of the shell. Adjacent such portion 41, the bolt has an annular shoulder 42 utilized in drawing the shell flange 17 against the hub flange, and preferably a lock washer 43 will be disposed between the shoulder and shell flange to constantly maintain a tight connection. The outer end of the bolt has a polygonal head for facilitating turning thereof, and consequently, when the head is turned the bolt will be threaded into the hub flange and this operation serves to draw the shoulder 42 and lock washer 43 against the shell flange and hence the latter against the hub flange. The headed end of the bolt projects through a ring plate 44 having circumferentially spaced openings for the bolts, and this plate has its outer peripheral edge disposed in the groove provided between the shoulders 23 and 24 on the inner periphery of the hub shell.

The ring plate is so disposed with respect to the shell flange 17 and the bolt is of such length, that when the latter is separated from the hub flange the shoulder 42 cannot be moved sufficiently toward the outer end of the shell to permit the threaded end of the bolt to fall out of the opening in the shell flange. Consequently, the bolt will be able to move axially through the shell flange 17 and the ring plate 44 for manipulating purposes but when disconnected from the hub flange, it cannot be separated from the shell. Therefore the bolts always remain assembled with the shell. This is advantageous because it prevents loss of bolts and moreover the bolts are always in proper position and it is only necessary to tighten them to secure the wheel to the hub.

The ring plate 44 may be positioned in the hub shell in the following manner. Originally the plate may be slightly conical in form and its outer peripheral edge is of such diameter that it can be disposed between the shoulders 23 and 24 of the shell. After so positioning the plate, axial pressure is exerted against the central portion thereof and its form is changed from conical to that in which it defines a radial plane. During this operation it is manifest that the outer peripheral portion of the plate must increase in diameter and this change in diameter causes the outer peripheral edge to be forced tightly against the shell between the shoulders 23 and 24. After so positioning the plate by means of pressure, it is apparent that during all practical operations of the wheel the plate will not loosen. The heads on the bolt project outwardly of the ring plate at all times and hence may be manipulated without difficulty through the opening in the outer end of the shell.

For tightening the bolts as well as removing and mounting the wheel, tools indicated at 50 are provided, each of which has a bent end portion 51 provided with a polygonal socket 52 for engaging the heads on the bolts, and a portion 53 having a threaded end adapted to engage one of the threaded openings 20 in the shell flange 17. When the tool is used for tightening the bolts, the polygonal head 52 is employed whereas when it is desired to remove the wheel the threaded end of the tool is threaded into an opening 20 in the shell flange 17 and caused to bear against the hub flange 37 thereby to forcefully separate the wheel from the hub. Preferably two tools will be used as shown by Fig. 1, in removing the wheel and disposed in diametrically opposed relation. Under such conditions, the bent portions 51 of the tools serve as handles permitting an operator to thread the tools into the openings 20 as well as to lift the wheel readily in the mounting and demounting thereof. After the wheel is mounted the tools of course are not used except for the purpose of tightening the bolts.

It is to be noted that the arrangement of the bolts, and the provision of the retaining ring 44 and the tools 50, permits locating the bolts closely adjacent to the inner hub shell surface, because it is unnecessary to provide a large clearance between the bolts and hub shell for enabling an operator to place and initially manipulate the bolts with the fingers. It follows that a smaller and less expansive hub shell may be used, while still having the bolts concealed within the shell. Particularly the above described arrangement in conjunction with the extension of the shell over the hub flange and into the plane of the brake drum, while maintaining the shell close to the hub flange, permits using a shell of minimum diameter while still providing a proper support and location for the rim and tire tread and readily accessible, manipulatable and concealed securing bolts.

As the hub shell is mounted on the hub, the flange 17 thereon has a reasonably close fit with surface wall 55 on the hub although radial movement of the wheel with respect to the hub is substantially prevented by clamping action of the bolts 40. Also when the hub shell is in its proper and operative position the outer extremity of the tapered surface portion 12 thereof projects over and beyond the hub flange 37 and into an annular recessed portion 56 of the brake disc member 38. This assembly and relation of parts permits disposing the hub shell close to the brake disc, as well as the brake disc close to the rim supporting means such as the metal spokes. Hence the parts may be assembled in a close, nested relation and less axial space will be taken up by the wheel and it follows that body lines of vehicles upon which the wheel is adapted to be mounted need not be changed as much to accommodate parts of the wheel. Moreover this arrangement permits locating the tread of the wheel nearer to the plane of the brake drum which is desirable particularly in front wheel constructions because steering is made easier.

It is preferred to chrome plate the outer surface of the hub shell, from the outer end thereof to and including the shoulder 14, and it is evident then that the latter serves as a convenient stopping line during the chrome plating operation. Ordinarily this part of the hub shell is the only part of the wheel which normally is subjected to marring or scratching factors such as flying stones etc. Preferably the remainder of the wheel surfaces exposed will be painted, and this feature in conjunction with the outer chrome plated shell portion, insures a neat and attractive wheel that will under ordinary conditions maintain its finished appearance.

The shell 10 is also adapted for wire spokes, disc and wood wheels and the manner in which the wheels are mounted on the shell and how they are positioned is clearly disclosed in my previously identified copending application for patent. The disc and wood spoke wheels may be mounted similarly to the metal spoke wheel shown by Fig. 2, whereas the wire spokes may be in two series connected respectively to portions 12 and 13, with the inner series connected close to the inner end of the shell.

From the above description taken in connection with the various figures in the drawing, it should be apparent that a wheel assembly has been provided which requires less axial space and hence avoids irregularities in body lines of vehicles ordinarily necessary to accommodate parts of the wheel because of its axial length. Moreover, it is apparent that as so assembled, the rim supporting means are located adjacent to the brake drum and more directly over the hub portion upon which the hub shell is supported. It also is apparent that a novel form of hub shell has been provided which preferably is constructed of sheet steel and that a novel method of constructing the shell is advanced, all of which increases the efficiency of manufacturing operations. It is also apparent that novel means are provided for demounting and mounting the wheel in the form of tools adapted to cooperate with the hub shell and openings in the flange thereon, and that such tools may be connected to the shell in a positive manner for facilitating manipulation of the wheel by an operator. It is also apparent that the bolts for securing the hub shell to the hub are always maintained assembled with the former, thereby avoiding loss of bolts as well as avoiding manual placing and removing thereof. It is also apparent that a novel hub shell construction for this purpose has been provided and a novel method of assembling the bolts with the shell and maintaining them so assembled has been advanced which renders it easy to properly position the bolts and leave them in their normally axially disposed positions.

Although certain forms of the invention have been described and illustrated, it will be apparent to those skilled in the art that various modifications may be made without departing from the scope of the appended claims.

I claim:

1. In combination, a hub, a hub shell around the hub, and having an apertured wall projecting inwardly from its inner periphery, threaded fastening means extending through the apertured wall, an apertured ring on the inner periphery of the shell in spaced relation to the wall, shell fastening means projecting through the ring and wall, means on the fastening means and between the wall and ring for preventing separation of such fastening means from the shell, and operating means on that end of the fastening means outwardly of the ring.

2. A wheel comprising a hub shell, rim supporting means on the shell, axially spaced and inwardly projecting apertured projections on the inner periphery of the shell, a bolt movably projecting through the apertures in both projections and having one end threaded and adapted to project beyond one of the projections and to be threaded into a wheel supporting member, means on the bolt between the projections for preventing complete removal of the bolts from the projections while permitting limited axial movement of the bolt with respect to the projections, and means on the end of the bolt opposite its threaded end for turning the bolt.

3. A wheel comprising a hub shell, rim supporting means on the shell, axially spaced and inwardly projecting ring flanges on the inner periphery of the shell, said flanges having circumferentially spaced apertures with the apertures in one flange respectively aligned axially with the apertures in the other flange, bolts projecting through the apertures in both flanges and each having one end threaded and adapted to project beyond one of the flanges and to be threaded into a wheel supporting member, means on the bolts between the flanges for preventing complete removal of the bolts from the flanges while permitting limited axial movement of the bolts, and means on the ends of the bolts opposite their threaded ends for turning the bolts.

4. In combination a wheel hub, a hub shell around the hub and having a projecting portion on its inner periphery provided with circumferentially spaced apertures, threaded fastening means extending through the apertures for fastening the shell to the hub and including a shoulder adapted to engage the projecting portion so as to hold the latter against the hub, and a ring fastened to the inner periphery of the shell and axially spaced relative to the projecting portion and having apertures aligned with the apertures in the projecting portion, said threaded fastening means having outer end portions axially movable through the apertures in the ring, and the distance between the projecting portion and the ring being such that axial movement of the fastening means in either direction will be limited by the shoulder engaging the projecting portion or the ring before either end of the fastening means moves out of the aperture therefor, whereby the fastening means may be moved axially for mounting and demounting of the wheel but cannot become separated from the wheel.

EMIL A. NELSON.